United States Patent
Gasda et al.

(10) Patent No.: US 10,680,251 B2
(45) Date of Patent: Jun. 9, 2020

(54) SOFC INCLUDING REDOX-TOLERANT ANODE ELECTRODE AND SYSTEM INCLUDING THE SAME

(71) Applicant: BLOOM ENERGY CORPORATION, Sunnyvale, CA (US)

(72) Inventors: Michael Gasda, Mountain View, CA (US); Emad El Batawi, Sunnyvale, CA (US); Tad Armstrong, Burlingame, CA (US); Vijay Radhakrishnan, Mumbai (IN); Jonathan Scholl, Mountain View, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 176 days.

(21) Appl. No.: 15/915,281

(22) Filed: Mar. 8, 2018

(65) Prior Publication Data

US 2019/0067705 A1 Feb. 28, 2019

Related U.S. Application Data

(60) Provisional application No. 62/550,845, filed on Aug. 28, 2017.

(51) Int. Cl.
*H01M 4/90* (2006.01)
*H01M 4/86* (2006.01)
(Continued)

(52) U.S. Cl.
CPC ....... *H01M 4/9033* (2013.01); *H01M 4/8657* (2013.01); *H01M 4/905* (2013.01);
(Continued)

(58) Field of Classification Search
CPC ............. H01M 4/9033; H01M 4/9066; H01M 2008/1293
See application file for complete search history.

(56) References Cited

U.S. PATENT DOCUMENTS

| 4,052,532 A | 10/1977 | Tannenberger |
| 4,272,353 A | 6/1981 | Lawrance et al. |

(Continued)

FOREIGN PATENT DOCUMENTS

| CN | 101147285 A | 3/2008 |
| CN | 101295792 A | 10/2008 |

(Continued)

OTHER PUBLICATIONS

Ahmad-Khantou et al., "Electrochemical & Microstructural Study of SOFC Cathodes Based on $La_{0.5}Sr_{0.3}MnO_3$ and $Pr_{0.65}Sr_{0.3}MnO_3$," Electrochemical Society Proceedings, 2001, p. 476-485, vol. 2001-16.

(Continued)

*Primary Examiner* — Maria Laios
(74) *Attorney, Agent, or Firm* — The Marbury Law Group, PLLC

(57) ABSTRACT

A solid oxide fuel cell, system including the same, and method of using the same, the fuel cell including an electrolyte disposed between an anode and a cathode. The anode includes a first layer including a metallic phase and a ceramic phase, and a second layer including a metallic phase. The metallic phase of the second layer includes a metal catalyst and a dopant selected from Al, Ca, Ce, Cr, Fe, Mg, Mn, Nb, Pr, Ti, V, W, or Zr, any oxide thereof, or any combination thereof. The second layer may also include a ceramic phase including ytterbia-ceria-scandia-stabilized zirconia (YCSSZ).

15 Claims, 2 Drawing Sheets

(51) Int. Cl.
*H01M 8/124* (2016.01)
*H01M 8/12* (2016.01)

(52) U.S. Cl.
CPC ............ *H01M 4/9066* (2013.01); *H01M 8/12* (2013.01); *H01M 2004/8684* (2013.01); *H01M 2008/1293* (2013.01)

(56) References Cited

U.S. PATENT DOCUMENTS

| | | |
|---|---|---|
| 4,426,269 A | 1/1984 | Brown et al. |
| 4,459,340 A | 7/1984 | Mason |
| 4,575,407 A | 3/1986 | Diller |
| 4,686,158 A | 8/1987 | Nishi et al. |
| 4,792,502 A | 12/1988 | Trocciola et al. |
| 4,804,592 A | 2/1989 | Vanderborgh et al. |
| 4,847,173 A | 7/1989 | Mitsunnaga et al. |
| 4,898,792 A | 2/1990 | Singh et al. |
| 4,913,982 A | 4/1990 | Kotchick et al. |
| 4,917,971 A | 4/1990 | Farooque |
| 4,925,745 A | 5/1990 | Remick et al. |
| 4,983,471 A | 1/1991 | Reichner et al. |
| 5,034,287 A | 7/1991 | Kunz |
| 5,047,299 A | 9/1991 | Shockling |
| 5,143,800 A | 9/1992 | George et al. |
| 5,162,167 A | 11/1992 | Minh et al. |
| 5,169,730 A | 12/1992 | Reichner et al. |
| 5,170,124 A | 12/1992 | Blair et al. |
| 5,171,645 A | 12/1992 | Khandkar |
| 5,192,334 A | 3/1993 | Rohr et al. |
| 5,213,910 A | 5/1993 | Yamada |
| 5,215,946 A | 6/1993 | Minh |
| 5,256,499 A | 10/1993 | Minh et al. |
| 5,273,837 A | 12/1993 | Aiken et al. |
| 5,290,323 A | 3/1994 | Ryoichi |
| 5,290,642 A | 3/1994 | Minh et al. |
| 5,302,470 A | 4/1994 | Okada et al. |
| 5,342,705 A | 8/1994 | Minh et al. |
| 5,368,667 A | 11/1994 | Minh et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,518,829 A | 5/1996 | Satake et al. |
| 5,527,631 A | 6/1996 | Singh et al. |
| 5,573,867 A | 11/1996 | Zafred et al. |
| 5,589,017 A | 12/1996 | Minh |
| 5,589,285 A | 12/1996 | Cable et al. |
| 5,601,937 A | 2/1997 | Isenberg |
| 5,686,196 A | 11/1997 | Singh et al. |
| 5,688,609 A | 11/1997 | Rostrup-Nielsen et al. |
| 5,733,675 A | 3/1998 | Dederer et al. |
| 5,741,406 A | 4/1998 | Barnett |
| 5,741,605 A | 4/1998 | Gillett et al. |
| 5,922,488 A | 7/1999 | Marucchi-Soos et al. |
| 5,955,039 A | 9/1999 | Dowdy |
| 5,993,989 A | 11/1999 | Baozhen |
| 6,013,385 A | 1/2000 | DuBose |
| 6,051,125 A | 4/2000 | Pham et al. |
| 6,099,985 A * | 8/2000 | Elangovan .......... H01M 4/9066 429/495 |
| 6,106,964 A | 8/2000 | Voss et al. |
| 6,228,521 B1 | 5/2001 | Kim et al. |
| 6,238,816 B1 | 5/2001 | Cable et al. |
| 6,280,865 B1 | 8/2001 | Eisman et al. |
| 6,287,716 B1 | 9/2001 | Hashimoto et al. |
| 6,329,090 B1 | 12/2001 | McElroy et al. |
| 6,361,892 B1 | 3/2002 | Ruhl et al. |
| 6,403,245 B1 | 6/2002 | Hunt |
| 6,436,562 B2 | 8/2002 | DuBose et al. |
| 6,451,466 B1 | 9/2002 | Grasso et al. |
| 6,489,050 B1 | 12/2002 | Ruhl et al. |
| 6,495,279 B1 | 12/2002 | Bogicevic et al. |
| 6,558,831 B1 | 5/2003 | Doshi et al. |
| 6,582,845 B2 | 6/2003 | Helfinstine et al. |
| 6,592,965 B1 | 7/2003 | Gordon |
| 6,605,316 B1 | 8/2003 | Visco |
| 6,623,880 B1 | 9/2003 | Geisbrecht et al. |
| 6,677,070 B2 | 1/2004 | Kearl |
| 6,682,842 B1 | 1/2004 | Visco et al. |
| 6,767,662 B2 | 7/2004 | Jacobson |
| 6,787,261 B2 | 9/2004 | Ukai |
| 6,803,141 B2 | 10/2004 | Pham |
| 6,811,913 B2 | 11/2004 | Ruhl |
| 6,821,663 B2 | 11/2004 | McElroy et al. |
| 6,854,688 B2 | 2/2005 | McElroy et al. |
| 6,924,053 B2 | 8/2005 | McElroy |
| 6,972,161 B2 | 12/2005 | Beatty et al. |
| 6,979,511 B2 | 12/2005 | Visco |
| 7,150,927 B2 | 12/2006 | Hickey et al. |
| 7,157,173 B2 | 1/2007 | Kwon |
| 7,255,956 B2 | 8/2007 | McElroy |
| 7,494,732 B2 | 2/2009 | Roy |
| 7,550,217 B2 | 6/2009 | Kwon |
| 7,563,503 B2 | 7/2009 | Gell |
| 7,601,183 B2 | 10/2009 | Larsen |
| 8,617,763 B2 | 12/2013 | Armstrong et al. |
| 8,748,056 B2 | 6/2014 | Batawi et al. |
| 2001/0049035 A1 | 12/2001 | Haltiner, Jr. et al. |
| 2002/0012825 A1 | 1/2002 | Sasahara et al. |
| 2002/0014417 A1 | 2/2002 | Kuehnle et al. |
| 2002/0028362 A1 | 3/2002 | Prediger et al. |
| 2002/0028367 A1 | 3/2002 | Sammes et al. |
| 2002/0058175 A1 | 5/2002 | Ruhl |
| 2002/0098406 A1 | 7/2002 | Huang et al. |
| 2002/0106544 A1 | 8/2002 | Noetzel et al. |
| 2002/0127455 A1 | 9/2002 | Pham et al. |
| 2002/0132156 A1 | 9/2002 | Ruhl et al. |
| 2003/0035989 A1 | 2/2003 | Gorte et al. |
| 2003/0162067 A1 | 8/2003 | McElroy |
| 2003/0165732 A1 | 9/2003 | McElroy |
| 2003/0196893 A1 | 10/2003 | McElroy |
| 2004/0081859 A1 | 4/2004 | McElroy et al. |
| 2004/0191595 A1 | 9/2004 | McElroy et al. |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0224193 A1 | 11/2004 | Mitlitsky et al. |
| 2005/0048334 A1 | 3/2005 | Sridhar et al. |
| 2005/0074650 A1 | 4/2005 | Sridhar et al. |
| 2005/0164051 A1 | 7/2005 | Venkataraman et al. |
| 2005/0227134 A1 | 10/2005 | Nguyen |
| 2005/0271919 A1 | 12/2005 | Hata et al. |
| 2006/0008682 A1 | 1/2006 | McLean et al. |
| 2006/0040168 A1 | 2/2006 | Sridhar |
| 2006/0166070 A1 | 7/2006 | Hickey et al. |
| 2006/0216575 A1 | 9/2006 | Cassidy |
| 2006/0222929 A1 | 10/2006 | Hickey et al. |
| 2007/0045125 A1 | 3/2007 | Hartvigsen et al. |
| 2007/0082254 A1 | 4/2007 | Hiwatashi |
| 2007/0287048 A1 | 5/2007 | Couse |
| 2007/0141423 A1 | 6/2007 | Suzuki |
| 2007/0141443 A1 | 6/2007 | Brown |
| 2007/0141444 A1 | 6/2007 | Brown |
| 2007/0224481 A1 | 9/2007 | Suzuki et al. |
| 2007/0237999 A1 | 10/2007 | Donahue |
| 2007/0275292 A1 | 11/2007 | Sin Xicola et al. |
| 2008/0029388 A1 | 2/2008 | Elangovan |
| 2008/0075984 A1 | 3/2008 | Badding |
| 2008/0076006 A1 | 3/2008 | Gottmann et al. |
| 2008/0096080 A1* | 4/2008 | Batawi ............... H01M 4/861 429/486 |
| 2008/0102337 A1 | 5/2008 | Hiroyuki |
| 2008/0166618 A1* | 7/2008 | Larsen ............... H01M 4/8605 429/489 |
| 2008/0254336 A1 | 10/2008 | Batawi |
| 2008/0261099 A1 | 10/2008 | Nguyen |
| 2009/0029195 A1 | 1/2009 | Gauckler |
| 2009/0068533 A1 | 3/2009 | Takayuki |
| 2009/0148742 A1 | 6/2009 | Day et al. |
| 2009/0186250 A1 | 7/2009 | Yeshwanth |
| 2009/0214919 A1 | 8/2009 | Suzuki |

(56) References Cited

U.S. PATENT DOCUMENTS

| | | |
|---|---|---|
| 2009/0291347 A1 | 11/2009 | Suzuki |
| 2011/0039183 A1 | 2/2011 | Armstrong et al. |
| 2011/0183233 A1* | 7/2011 | Armstrong ............ C04B 35/486 |
| | | 429/482 |

FOREIGN PATENT DOCUMENTS

| | | |
|---|---|---|
| GB | 1048839 A | 11/1966 |
| JP | 3196465 A | 8/1991 |
| JP | 6215778 | 8/1994 |
| JP | 2000-281438 | 10/2000 |
| JP | 2004507061 | 3/2004 |
| JP | 2004-531857 | 10/2004 |
| JP | 2008-239353 | 10/2008 |
| JP | 2008-541336 | 11/2008 |
| JP | 2009-110933 | 5/2009 |
| JP | 2015509277 | 3/2015 |
| KR | 20020092223 A | 12/2002 |
| KR | 20070095440 A | 9/2007 |
| KR | 20080010737 A | 1/2008 |
| KR | 20080097971 | 11/2008 |
| KR | 100886239 B1 | 2/2009 |
| KR | 20090061870 A | 6/2009 |
| WO | WO2004/093214 | 10/2004 |
| WO | WO2005/041329 | 5/2005 |
| WO | WO2006/079558 A1 | 8/2006 |
| WO | WO2008/019926 | 2/2008 |
| WO | WO2009/097110 | 8/2009 |

OTHER PUBLICATIONS

Mori et al., "Lanthanum Alkaline-Earth Manganites as a Cathode Material in High-Temperature Solid Oxide Fuel Cells," Journal of the Electrochemical Society, 1999, p. 4041-4047, vol. 146.

L.G. Austin, "Cell & Stack Construction: Low Temperature Cells," NASA SP-120, 1967.

EG & G Services, Parsons, Inc., SAIC, Fuel Cell Handbook, 5th Edition, USDOE, Oct. 2000, p. 9-1-9.4, and 9-12-9.14.

J.M. Sedlak, et al., "Hydrogen Recovery and Purification Using the Solid Polymer Electrolyte Electrolysis Cell," Int. J. Hydrogen Energy, vol. 6, p. 45-51, 1981.

Dr. Ruhl, "Low Cost Reversible Fuel Cell System," Proceedings of the 2000 U.S. DOE Hydrogen Program Review, Jun. 15, 2000, NREL/CP-570-30535.

Low Cost, Compact Solid Oxide Fuel Cell Generator, NASA Small Business Innovation Research Program.

Low Cost, High Efficiency Reversible Fuel Cell (and Electrolyzer) Systems, Proceedings of the 2001 DOE Hydrogen Program Review NREL/CP-570-30535.

Milliken et al., "Low Cost, High Efficiency Reversible Fuel Cell Systems," Proceedings of the 2002 U.S. DOE Hydrogen Program Review, NREL/CP-610-32405.

K. Eguchi et al., Power Generation and Steam Electrolysis Characteristics of an Electrochemical Cell with a Zirconia or Ceria based Electrode, Solid State Ionics, 86 88, 1996, p. 1245-1249.

F. Mitlitsky et al., "Regenerative Fuel Cells for High Altitude Long Endurance Solar Powered Aircraft," 28th Intersociety Energy Conversion Engineering Conference (IECED), Jul. 28, 1993, UCRL-JC-113485.

Small, Ultra Efficient Fuel Cell Systems, Advanced Technology Program, ATP 2001 Competition, Jun. 2002.

F. Mitlitsky et al., Unitized Regenerative Fuel Cells for Solar Rechargeable Aircraft and Zero Emission Vehicles, 1994 Fuel Cell Seminar, Sep. 6, 1994, UCRL-JC-117130.

Ralph et al., "Cathode Materials for Reduced-Temperature SOFCs," Journal of the Electrochemical Society, 2003, p. A1518-A1522, vol. 150.

Simmer et al., "Development of Fabrication Techniques and Electrodes for Solid Oxide Fuel Cells," Electrochemcial Society Proceedings, p. 1050-1061, vol. 2001-16.

Yamamoto et al., "Electrical Conductivity of Stabilized Zirconia with Ytterbia and Scandia," Solid State Ionics, v79, p. 137-142, Jul. 1995.

Araki et al., "Degradation Mechanism of Scandia-Stabilized Zirconia Electrolytes: Discussion based on Annealing Effects on Mechanical Strength, Ionic Conductivity, and Raman Spectrum," Solid State Ionics, v180, n28-31, p. 1484-1489, Nov. 2009.

Lybye et al., "Effect of Transition Metal Ions on the Conductivity and Stability of Stabilized Zirconia," Ceramic Engineering and Science Proceedings, v27, n4, p. 67-78, 2006.

International Search Report and Witten Opinion from the International Searching Authority for International Patent Application No. PCT/US2010/045182, dated Apr. 27, 2011, 10 pages.

Tikekar, N. M. et al., "Reduction and Reoxidation Kinetics of Nickel-Based SOFC Anodes," Journal of the Electrochemical Society, vol. 153, No. 4, pp. A654-A663, (2006).

Office Communication, Notification of Preliminary Rejection ("Office Action"), from KIPO for Korean Patent Application No. 10-2018-0037428, dated Jun. 20, 2019, 6 pages.

* cited by examiner

SOFC INCLUDING REDOX-TOLERANT ANODE ELECTRODE AND SYSTEM INCLUDING THE SAME

FIELD

Aspects of the present invention relate to a solid oxide fuel cell (SOFC) including a redox-tolerant anode and SOFC systems including the same.

BACKGROUND

In a high temperature fuel cell system, such as a SOFC system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, propane, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide.

The excess electrons from the negatively charged ion are routed back to the cathode side of the fuel cell through an electrical circuit completed between anode and cathode, resulting in an electrical current flow through the circuit.

SUMMARY

According to various embodiments, provided is a solid oxide fuel cell (SOFC) comprising: an ionically conductive electrolyte; an anode disposed on a first side of the electrolyte, the anode comprising: a first layer comprising a cermet comprising a ceramic phase and a metallic phase comprising a metal catalyst; and a second layer comprising a metallic phase comprising a metal catalyst and a dopant selected from Al, Ca, Ce, Cr, Fe, Mg, Mn, Nb, Pr, Ti, V, W, or Zr, any oxide thereof, or any combination thereof; and a cathode disposed on an opposing second side of the electrolyte, wherein the first layer is disposed between the second layer and the electrolyte.

According to various embodiments, provided is a solid oxide fuel cell (SOFC) comprising: an ionically conductive electrolyte; an anode disposed on a first side of the electrolyte, the anode comprising: a first layer comprising a cermet comprising a ceramic phase and a metallic phase comprising a metal catalyst; and a second layer comprising a metallic phase comprising a metal catalyst and a ceramic phase comprising ytterbia-ceria-scandia-stabilized zirconia (YC-SSZ); and a cathode disposed on an opposing second side of the electrolyte, wherein the first layer is disposed between the second layer and the electrolyte.

According to various embodiments, provided is a method of operating a fuel cell system comprising a SOFC stack, the method comprising: operating the system in a power generation mode that comprises providing a fuel and an oxidant to the stack, to generate electricity; and operating the system in a shutdown mode that comprises stopping the flow of the fuel and the oxidant to the stack, without intentionally providing an oxidizing purge gas to the stack before the stack reaches room temperature.

According to various embodiments, provided is a solid oxide fuel cell (SOFC) comprising an ionically conductive electrolyte, an anode disposed on a first side of the electrolyte, the anode comprising a first layer comprising a cermet comprising a ceramic phase and a metallic phase comprising a metal catalyst and a second layer comprising a cermet comprising a ceramic phase and a metallic phase comprising a metal catalyst, and a cathode disposed on an opposing second side of the electrolyte. The first layer is disposed between the second layer and the electrolyte. At least one of the first and the second layers further comprises a dopant selected from MgO or Mg.

DETAILED DESCRIPTION OF THE EXEMPLARY EMBODIMENTS

Figure 1:
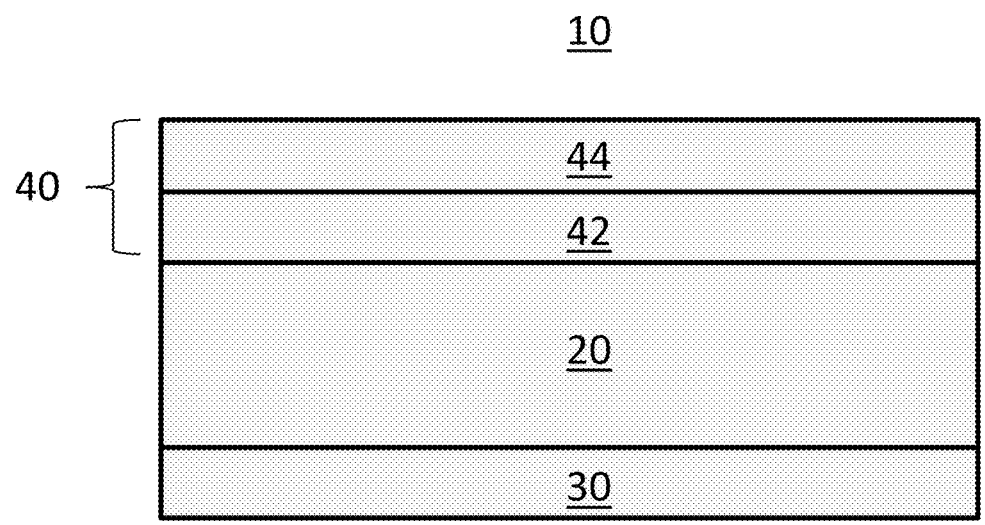
FIG. 1 is a cross-sectional view of a fuel cell according to various embodiments of the present disclosure.

According to various embodiments, a fuel cell, such as a solid oxide fuel cell (SOFC) includes an anode that allows for the direct internal reforming of hydrocarbon fuels on the anode and reliable operation under fuel starvation conditions. The fuel cell comprises a cathode electrode, a solid oxide electrolyte, and the anode electrode, and may be included in a fuel cell system. The anode electrode may comprise a cermet comprising a metallic phase, which may include nickel, and a ceramic phase. The anode may comprise a first layer and a second layer arranged such that the first layer is disposed between the electrolyte and the second layer. The first layer may have a lower porosity and metal content than the second layer.

In operation, a fuel stream is provided to the anode and an oxidant such as air is provided to the cathode. The fuel stream may include a mixture of hydrogen ($H_2$), carbon monoxide (CO), carbon dioxide ($CO_2$), steam ($H_2O$), methane ($CH_4$), and other trace hydrocarbon gases. Since fuel stream may be substantially oxygen-free, the anode environment is chemically reducing. As such, nickel oxide in the anode may be reduced to nickel metal, such that the nickel operates as a catalyst during operation of the fuel cell.

However, sometimes the fuel stream is interrupted, such as for example when the fuel cell or system thereof must be shut down for service. In such system operating interruptions, the fuel stream is stopped, and oxygen can leak in through aged seals, or diffuse upstream through an exhaust port. When the anode is exposed to oxygen, especially at a high temperature (e.g., temperatures above 300° C.), the metal catalyst (e.g., nickel) included in the anode may be chemically oxidized.

Without wishing to be bound by theory, it is thought that with each redox cycle, nickel particles agglomerate into larger and larger particles, such that the agglomerated nickel particles are formed. When larger nickel particles are oxidized, the volumetric expansion associated with the oxidation may result in anode damage and eventual delamination of the anode. It is believed that the volume expansion during the oxidation of Ni to NiO may also result in microcracking in the ceramic phase, thus decreasing ionic conduction in some regions of the anode and reducing effectiveness of the anode. The following exemplary embodiments provide anode compositions and/or structures configured to reduce and/or eliminate such problems.

Fuel cell systems generally include a desulfurization system to remove sulfur from a fuel stream. Such systems may include one or more desulfurization canisters. Desulfurization canisters eventually become exhausted (e.g., saturated with sulfur) and lose the ability to adsorb additional sulfur. This may result in a "breakthrough event" wherein fuel cell anodes are exposed to a fuel stream containing sulfur. As such, such canisters must be periodically replaced.

However, it may be difficult to predict desulfurization canister exhaustion. Further, it may be difficult and expensive to replace desulfurization canisters. Therefore, stack health may be monitored to indirectly detect canister exhaustion, since the exposure of fuel cell anodes to sulfur reduces stack health.

After sufficient sulfur exposure, a redox cycle can occur that includes a short oxidation of the anodes followed by a reduction of the anodes which may allow for the removal of at least some of the sulfur from fuel cell anodes, and at least partial recovery of anode functionality. Herein, "sulfur tolerance" may refer to the ability of an anode to recover functionality after a redox cycle. Conventional anodes may not fully recover after a redox cycle, and repeated redox cycles may further reduce anode functionality.

FIG. 1 illustrates an exemplary fuel cell 10, according to various embodiments of the present disclosure. Referring to FIG. 1, the fuel cell 10 may be a SOFC that contains an electrolyte 20 disposed between a cathode 30 (e.g., first electrode) and an anode 40 (e.g. second electrode). The electrolyte 20 may comprise an ionically conductive ceramic, such as doped zirconia, doped ceria, and/or any other suitable ionically conductive ceramic oxide material. For example, the electrolyte 20 may include yttria-stabilized zirconia (YSZ), scandia-stabilized zirconia (SSZ), ytterbia-ceria-scandia-stabilized zirconia (YCSSZ), such as 9-11 mol % scandia, 0.5 to 1.5 mol % ceria, and 0.25 to 1.5 mol % ytterbia, or blends thereof as described in U.S. Pat. No. 8,580,456, incorporated herein by reference in its entirety. In other embodiments, the electrolyte may include samaria, gadolinia, or yttria-doped ceria.

The cathode 30 may include an electrically conductive material, such as an electrically conductive perovskite material, such as lanthanum strontium manganite (LSM). Other conductive perovskites, such as lanthanum strontium cobaltite $(La,Sr)CoO_3$("LSCo"), lanthanum strontium cobalt ferrite $(La,Sr)(Co,Fe)O_3$, etc., or metals, such as Pt, may also be used.

Furthermore, if desired, additional contact or current collector layers may be placed over the cathode 30 and anode 40, while additional interfacial layers, such as doped ceria interfacial layers, may be located between the electrodes 30, 40 and the electrolyte. For example, a Ni or nickel oxide anode contact layer and an LSM or LSCo cathode contact layer may be formed on the anode 40 and cathode 30 electrodes, respectively.

The anode 40 may comprise at least one cermet that includes a metallic phase and a ceramic phase. The metallic phase may include a metal catalyst and the ceramic phase may include one or more ceramic materials. The metallic phase may be very finely dispersed within the ceramic matrix of the ceramic phase, so as to limit damage that may occur if the metallic phase is oxidized. For example, the metallic phase may have an average grain size less than 500 nanometers, such as from about 100 to about 400 nanometers.

The ceramic phase of the anode 40 may comprise any suitable ionically conductive ceramic material, such as a doped ceria and/or a doped zirconia. For example, the ceramic phase may include, but is not limited to gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), or the like. In the YCSSZ, scandia may be present in an amount equal to 9 to 11 mol %, such as 10 mol %, ceria may present in amount greater than 0 (e.g., at least 0.5 mol %) and equal to or less than 2.5 mol %, such as 1 mol %, and at least one of yttria and ytterbia may be present in an amount greater than 0 and equal to or less than 2.5 mol %, such as 1 mol %, as disclosed in U.S. Pat. No. 8,580,456, which is incorporated herein, by reference. Yttria stabilized zirconia (YSZ) may be excluded from the ceramic phase of the anode 40.

The metallic phase may include a metal catalyst, such as nickel (Ni), cobalt (Co), copper (Cu), alloys thereof, or the like, which operates as an electron conductor. The metal catalyst may be in a metallic state or may be in an oxide state. For example, the metal catalyst forms a metal oxide when it is in an oxidized state. Thus, the anode 40 may be annealed in a reducing atmosphere prior to operation of the fuel cell 10, to reduce the metal catalyst to a metallic state.

According to some embodiments, the metallic phase may include the metal catalyst and a dopant. For example, the metallic phase may be represented by Formula 1: $[D_xM_{1-x}]_yO$. In Formula 1, D is a dopant (in any oxidation state) selected from magnesium (Mg), calcium (Ca), titanium (Ti), aluminum (Al), manganese (Mn), tungsten (W), niobium (Nb), chromium (Cr), iron (Fe), vanadium (V), praseodymium (Pr), cerium (Ce), zirconium (Zr) or the like, or any combination thereof. In some embodiments, D may be Ca, Mg, and/or Ti. M is a metal catalyst selected from nickel (Ni), cobalt (Co), copper (Cu), or alloys thereof. X may range from about 0.01 to about 0.1, and y may range from about 1 to about 2. In other embodiments, x may range from about 0.01 to about 0.04. For example, x may be about 0.02 and y may be either 1 or 2.

Accordingly, the metallic phase may comprise from about 1 to about 10 atomic percent ("at %") of the metal oxide dopant and about 99 to about 90 at % of the metal catalyst. For example, the metallic phase may comprise from about 2 to about 4 at % of the metal oxide dopant and about 98 to about 96 at % of the metal catalyst, as manufactured before being reduced.

According to various embodiments, the anode 40 may include a metallic phase that includes NiO doped with MgO. For example, the metallic phase may include $Mg_xNi_{1-x}O$, wherein x is within the ranges described above. After anode manufacture and before or during fuel cell operation, the metallic phase is reduced by being exposed to a reducing ambient (e.g., fuel) at an elevated temperature (e.g., at a temperature ranging from about 750-950° C.). The reduced metallic phase may be represented by the formula $D_xM_{1-x}$.

Without wishing to be bound by theory, it is believed that when the metal oxide dopant is added to the metal catalyst, the reduction and re-oxidation kinetics of the anode 40 are slowed down. By slowing down the reoxidation, the metallic phase may have enough time to cool down before the metal catalyst (e.g., nickel) is completely oxidized, thereby limiting the damage done by the oxidation cycle. Secondly, it is believed that the dispersion of metal oxides in the metal catalyst helps prevent agglomeration, which subsequently decreases the amount of damage to the ceramic phase (e.g., SDC) that may occur during metal catalyst oxidation.

The anode 40 may be an oxidation-tolerant electrode having a functionally graded configuration. For example, as shown in FIG. 1, the anode 40 may include a first layer 42 disposed on the electrolyte 20, and a second layer 44 disposed on the first layer 42. The first layer 42 may be disposed closer to the electrolyte 20 than the second layer 44. The first layer 42 may be configured to electrochemically oxidize a fuel. The second layer 44 may be configured for electron conduction and may operate as a reforming catalyst. The second layer 44 may have a higher porosity than the first layer 42. YSZ may be excluded from the ceramic phase of the first layer 42 and/or the second layer 44. The first and/or second layers 42, 44 may have a porosity ranging from about 5-60 volume percent. For example, the first layer 42 may have a porosity of 5-30 volume percent, and the second layer 44 may contain a porosity of 31 to 60 volume percent.

The first and second layers 42, 44 may each include a cermet including a metallic phase and a ceramic phase, as described above. The metallic phases and/or the ceramic phases of the first and second layers 42, 44 may include the same or different materials. In some embodiments, one of both of the first and second layers 42, 44 may include only a single phase. For example, the second layer 44 may include a metallic phase and the ceramic phase may be omitted.

In some embodiments, the first layer 42 may include, by weight percent, more of the ceramic phase and less of the metallic phase than the second layer 44. A weight percent ratio of the ceramic phase to the metallic phase included in the first layer 42 may range from about 99:1 to about 50:50. For example, the first layer 42 may include from about 70 to about 90 wt % of the ceramic phase, and from about 10 to about 30 wt % of the metallic phase, based on the total weight of the first layer 42. In some embodiments, the first layer 42 may include about 80 wt % of the ceramic phase and about 20 wt % of the metallic phase.

A weight percent ratio of the ceramic phase to the metallic phase in the second layer 44 may range from about 0:100 to about 50:50. For example, the second layer 44 may include from about 15 to about 35 wt % of the ceramic phase, and from about 65 to about 85 wt % of the metallic phase, based on the total weight of the second layer 44. In some embodiments, the second layer 44 may include about 25 wt % of the ceramic phase and about 75 wt % of the metallic phase. In other embodiments, the second layer 44 may include from about 90 to 100 wt % of the metallic phase. In other embodiments, when the second layer 44 includes a metallic phase comprising a metal catalyst doped with a metal oxide dopant, the metallic phase may make up all, or substantially all, of the second layer 44. The dopant may be located in at least one of the first layer 42 and second layer 44, such as only in the first layer 42, only in the second layer 44 or in both first and second layers 42, 44.

In some embodiments, the anode 40 may be exposed to a fuel stream that contains sulfur, such as when a breakthrough even occurs in a fuel desulfurization system. Accordingly, the sulfur tolerance of the anode 40 may be an important consideration. Without intending to be bound to a particular theory, it is believed that the thickness of the second layer 44 may be important to providing sulfur tolerance to the anode 40. For example, the second layer 44 may have a thickness ranging from about 5 µm to about 35 µm, such as from about 7 µm to about 30 µm, or from about 10 µm to about 25 µm.

The fuel cell 10 may be manufactured by forming the cathode 30 on a first side of the electrolyte 20, and forming the anode 40 on a second side of the electrolyte 20, using screen printing, inkjet printing, or other suitable methods, as disclosed in U.S. Pat. No. 8,617,763, which is incorporated herein by reference.

In particular, ceramic and metallic phases of the anode 40 may be manufactured in a single-step process (e.g., by co-synthesis or co-precipitation) for each layer 42, 44. Alternatively, the ceramic and metallic phases can be manufactured separately and then mixed in appropriate amounts for each layer 42, 44. The phases may be manufactured in the form of powders or inks, which may be mixed and deposited on a substrate, such as the electrolyte 20. Once deposited, the anode 40 and/or cathode 30 may be sintered in a reducing atmosphere. In particular, the anode 40 and cathode 30 may be sintered separately, or may be sintered together in a single step.

For co-synthesized powders, some amount of the ceramic may incidentally dope the metallic phase (e.g., if SDC is used as the ceramic phase, some amount of ceria ($CeO_2$) may be present as a dopant in the metallic phase.

Additional embodiments are provided by the following non-limiting examples of anode compositions.

EXAMPLE 1

According to various embodiments, the first layer 42 of the fuel cell 10 may include a ceramic phase comprising SDC and a metallic phase comprising NiO. In particular, the first layer 42 may include from about 0 to about 50 wt % of the NiO metallic phase and from about 50 to about 100 wt % of the SDC ceramic phase. For example, the first layer 42 may include from about 20 to about 30 wt % of the NiO metallic phase and from about 80 to about 70 wt % of the SDC ceramic phase. In some embodiments, the first layer 42 may include from about 20 wt % of the NiO metallic phase and about 80 wt % of the SDC ceramic phase. Thus, the first layer 42 may be dopant free.

The second layer 44 may include a metallic phase comprising MgNi oxide (e.g., MgO as the metal oxide dopant) and no ceramic phase. The MgNi oxide may be represented by the formula $Mg_xNi_{1-x}O$, where x ranges from 0.01 to 0.10. In some embodiments, x may range about 0.02 to about 0.04. For example, the second layer 44 may include 100 wt % of an $Mg_{0.02}Ni_{0.98}O$ and no ceramic phase. The second layer 44 may be later reduced to $Mg_xNi_{1-x}$.

EXAMPLE 2

According to various embodiments, the first layer 42 of the fuel cell 10 may be substantially the same as in Example 1. For example, the first layer 42 may include about 20 wt % of a NiO metallic phase and about 80 wt % of an SDC ceramic phase.

The second layer 44 may include a metallic phase comprising MgNi oxide as described above and a ceramic phase comprising SDC. For example, the second layer 44 may include from about 50 to 99 wt % of the MgNi oxide metallic phase and from about 50 to about 1 wt % of the SDC ceramic phase. In some embodiments, the second layer 44 may include from about 75 to about 80 wt % of the NiMg oxide metallic phase and from about 25 to about 20 wt % of the SDC ceramic phase, before reduction of the MgNi oxide to MgNi.

EXAMPLE 3

According to various embodiments, the first layer 42 and the second layers 44 of the fuel cell 10 may be similar to those of Example 2, except that the first layer 42 includes MgNi oxide as described above, in place of NiO, in the same weight percentages. For example, the first layer 42 may include from 20 to about 30 wt % of an $Mg_{0.92}Ni_{0.98}O$ metallic phase and from about 80 to about 70 wt % of an SDC ceramic phase. In some embodiments, the second layer 44 may include 75 wt % of an $Mg_{0.02}M_{0.98}O$ metallic phase and 25 wt % of an SDC ceramic phase, before reduction of the MgNi oxide to MgNi.

EXAMPLE 4

According to various embodiments, the first layer 42 of the fuel cell 10 may include a NiO metallic phase and an SDC ceramic phase as disclosed in Example 1. For example, the first layer 42 may about 20 wt % of the NiO metallic phase and about 80 wt % of the SDC ceramic phase.

The second layer 44 may be similar to the second layer 44 of Example 3, except that an YCSSZ ceramic phase may be substituted for the SCD ceramic phase. For example, the second layer 44 may include 75 wt % of an $Mg_{0.92}Ni_{0.98}O$ metallic phase and 25 wt % of an YCSSZ ceramic phase, before reduction of the MgNi oxide to MgNi. Without wishing to be bound to any particular theory, it is believed that MgO may be absorbed into SDC during redox cycling. As such, replacing SDC with YCSSZ in the second layer 44 may result in the second layer 44 being more robust during redox cycling.

EXAMPLE 5

According to various embodiments, the first layer 42 of the fuel cell 10 may be similar to the first layer 42 of Example 4, except that an YCSSZ ceramic phase may be substituted for the SCD ceramic phase. For example, the first layer 42 of Example 5 may include about 20 wt % of an $Mg_{0.02}Ni_{0.98}O$ metallic phase and about 80 wt % of an YCSSZ ceramic phase, before reduction of the MgNi oxide to MgNi. The second layer 44 may be substantially the same as the second layer of Example 4. For example, the second layer 44 may include 75 wt % of an $Mg_{0.02}Ni_{0.98}O$ metallic phase and 25 wt % of an YCSSZ ceramic phase, before reduction of the MgNi oxide to MgNi.

Figure 2:
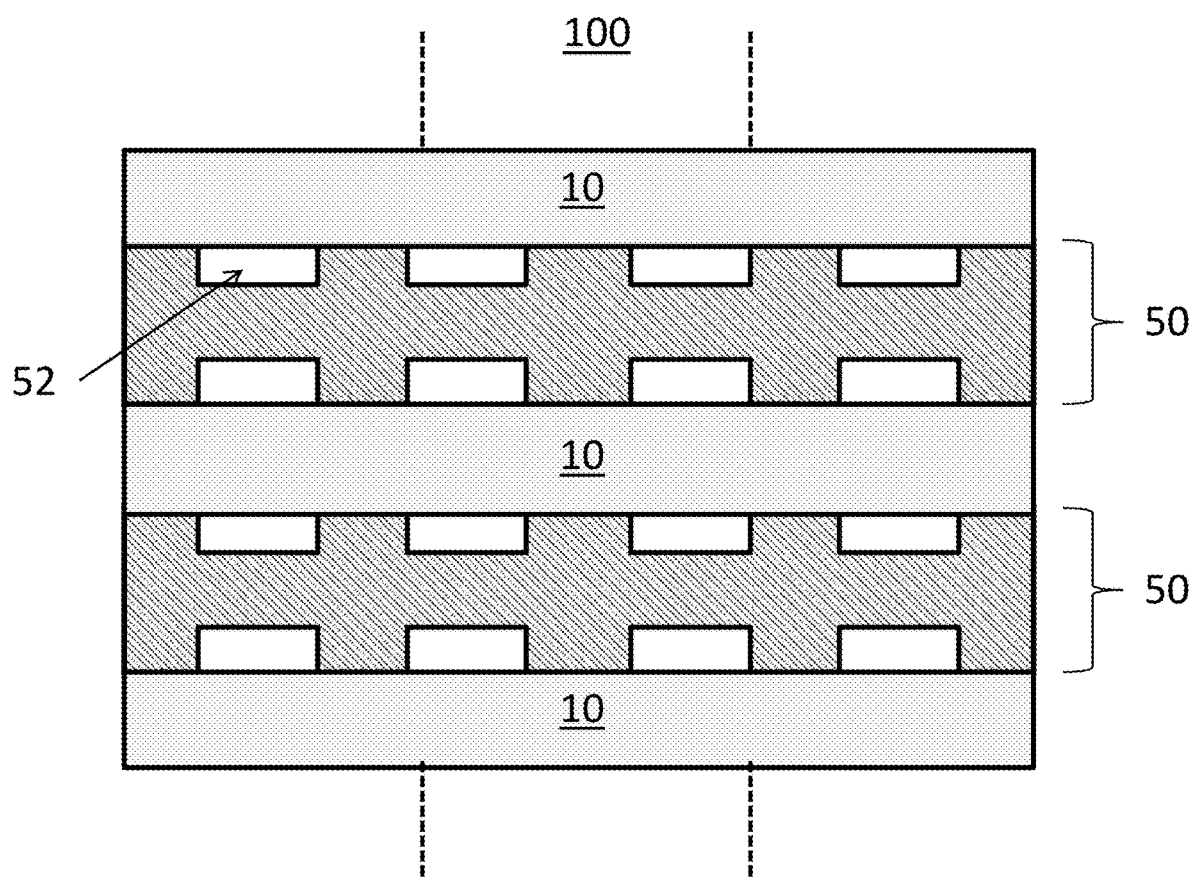
FIG. 2 is a cross-sectional view of a fuel cell stack according to various embodiments of the present disclosure.

FIG. 2 illustrates a plan view of a fuel cell stack 100 according to various embodiments of the present disclosure. Referring to FIG. 2, the stack 100 includes fuel cells 10 of FIG. 1 stacked on one another and separated by interconnects 50. The interconnects 50 include flow channels 52 configured to provide fuel or air to the fuel cells 10. The interconnects 50 may also operate to electrically connect the fuel cells 10 in series.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

Figure 3:
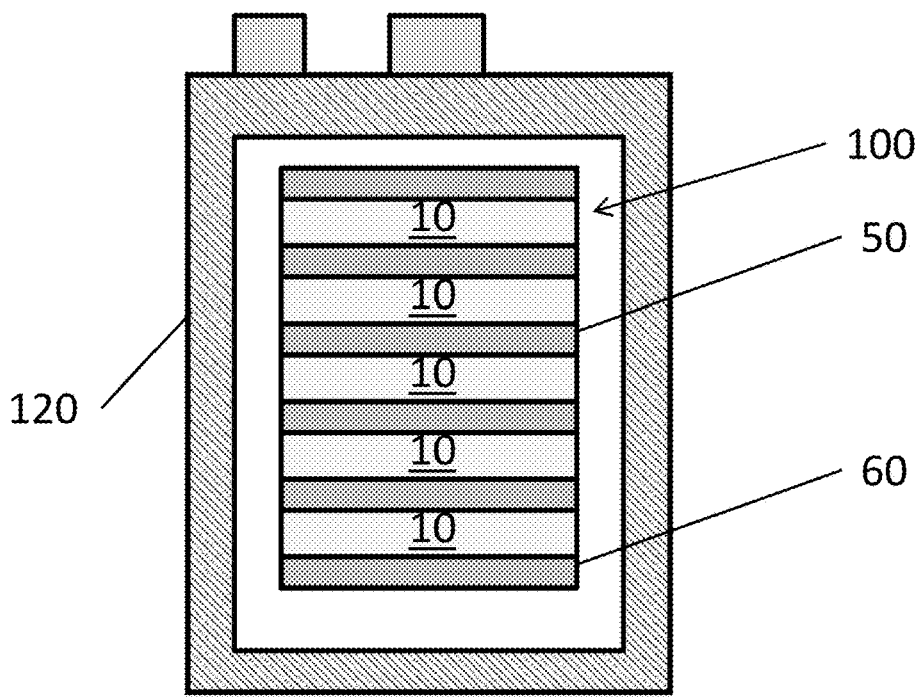
FIG. 3 is a schematic side cross-sectional view of a hotbox of a fuel cell system, according to various embodiments of the present disclosure.

FIG. 3 illustrates a schematic side cross-sectional view of a fuel cell system hotbox 120 including the stack 100 of FIG. 2, according to various embodiments of the present disclosure. Referring to FIG. 3, the hotbox 120 is shown to include the fuel cell stack 100. However, the hotbox 120 may include two or more of the stacks 100. The stack 100 may include the electrically connected fuel cells 10 stacked on one another, with the interconnects 50 disposed between the fuel cells 10, and end plates 60. The hotbox 120 may include other components, such as fuel conduits, air conduits, seals, electrical contacts, heat exchangers, tail gas oxidizers, etc., and may be incorporated into a fuel cell system including balance of plant components. The interconnects 50 and/or end plates 60 may comprise any suitable gas impermeable and electrically conductive material, such as a metal or metal alloy (for example, a Cr—Fe alloy including 4-6 wt % Fe, 0-1 wt % $Y_2O_3$, and a balance of Cr). The interconnects 50 electrically connect adjacent fuel cells 10 and provide channels for fuel and air to reach the fuel cells 10.

Figure 4:
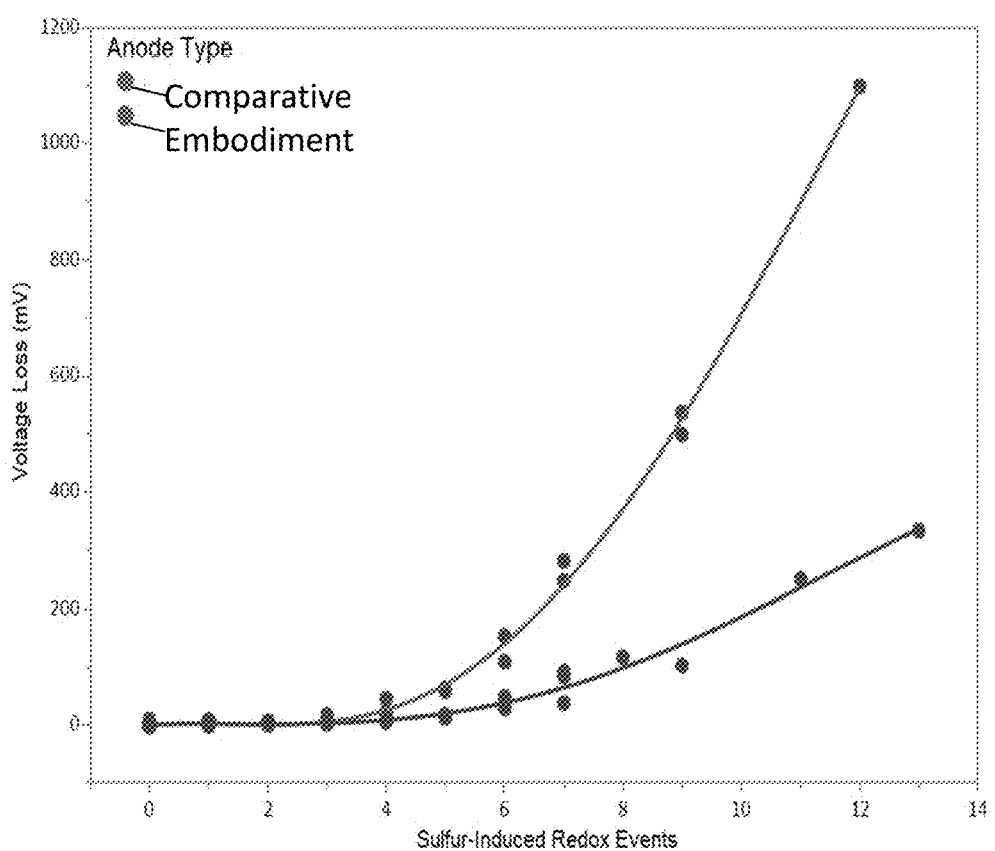
FIG. 4 is a graph showing a comparison of voltage losses after sulfur-induced redox events (cycles) of a comparative fuel cell and an exemplary fuel cell according to various embodiments of the present disclosure.

FIG. 4 is a graph showing a comparison of voltage losses after sulfur-induced redox events (cycles) of a comparative fuel cell and an exemplary fuel cell according to various embodiments. In particular, the comparative fuel cell included a comparative anode including, by weight, a first layer of 20% NiO and 80% SDC, and a second layer of 75 wt. % NiO and 25 wt. % SDC. The exemplary fuel cell included an anode including, by weight, a first layer of 20 wt. % NiO and 80 wt. % SDC, and a second layer having a thickness between 20 and 25 microns containing 25 wt. % SDC and 75 wt. % $Mg_{0.02}Ni_{0.98}O$ which is converted to nickel alloyed with magnesium after the anode is subjected to a reduction treatment.

As can be seen in FIG. 4, after 4 redox cycles (i.e., anode oxidation and reduction), the comparative fuel cell began to exhibit a higher voltage loss than the exemplary fuel cell, and the rate of voltage loss accelerated thereafter. The voltage loss of the exemplary fuel cell occurred at a much lower rate than the comparative fuel cell. After 13 redox cycles, the exemplary fuel cell had a voltage loss of less than 600 mV, such as less than 500 mV, such as less than 400 mV, for example 334 to 550 mV, including 334 to 450 mV, such as 334 to 400 mV (for example 334 mV as shown in FIG. 4), while the comparative fuel cell exhibited a voltage loss of about 1199 mV, after only 12 redox cycles.

The metal oxide dopants may operate to decrease kinetic rates of reduction and oxidation processes in fuel cell anodes. However, the benefits of a metal oxide dopant may not be fully realized during relatively rapid oxidation processes, such as during an air flush of a fuel cell system. However, the present inventors have determined that during relatively slow oxidation processes, such as during normal fuel cell system shutdown, where air passively diffuses into a hotbox to reach fuel cell stacks, metal oxide dopants may be especially beneficial, in terms of redox tolerance.

According to various embodiments, a method of operating a SOFC fuel cell system including fuel cell stack (including fuel cells as described above) includes operating the system in a power generation mode and a shutdown mode. During the power generation mode, a fuel and an oxidant are provided to the stack to generate electricity. During the shutdown mode, the flow of fuel and oxidant are stopped, without intentionally providing an oxidizing purge gas (e.g., an air flush) to the fuel cell or stack until the stack reaches room temperature. In other words, as the fuel cell or stack cools during the shutdown mode, only a small amount oxidant may reach the fuel cell, due to an unavoidable infiltration of air into to the hotbox of the system, as the system cools. Accordingly, the benefits of the metal oxide dopant included in the stack anodes may be fully realized.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A solid oxide fuel cell (SOFC) comprising: an ionically conductive electrolyte;
   an anode disposed on a first side of the electrolyte, the anode comprising: a first layer comprising a cermet comprising a ceramic phase and a metallic phase comprising a metal catalyst; and
   a second layer comprising a metallic phase comprising a metal catalyst comprising NiO and a dopant comprising MgO; and
   a cathode disposed on an opposing second side of the electrolyte,
   wherein the first layer is disposed between the second layer and the electrolyte; and
   wherein the metallic phase of the second layer comprises $Mg_xNi_{1-x}O$, wherein x ranges from about 0.01 to about 0.04.

2. The SOFC of claim 1, wherein the metallic phase of the second layer comprises:
   from about 1 to about 10 atomic percent of the dopant; and
   from about 99 to about 90 atomic percent of the metal catalyst.

3. The SOFC of claim 1, wherein the metallic phase of the second layer comprises:
   from about 2 to about 4 atomic percent of the dopant; and
   from about 98 to about 96 atomic percent of the metal catalyst.

4. The SOFC of claim 1, wherein:
   the first layer comprises from about 70 to about 90 wt % of the ceramic phase, and from about 10 to about 30 wt % of the metallic phase, based on the total weight of the first layer; and
   the second layer comprises from about 15 to about 35 wt % of a ceramic phase, and from about 65 to about 85 wt % of the metallic phase, based on the total weight of the second layer.

5. The SOFC of claim 4, wherein the metallic phase of the first layer further comprises a dopant selected from Al, Ca, Ce, Cr, Fe, Mg, Mn, Nb, Pr, Ti, V, W, or Zr, any oxide thereof, or any combination thereof.

6. The SOFC of claim 4, wherein the ceramic phase of one or both of the first and second layers comprises ytterbia-ceria-scandia-stabilized zirconia (YCSSZ).

7. The SOFC of claim 4, wherein the thickness of second layer ranges from about 5 μm to about 35 μm.

8. The SOFC of claim 4, wherein:
   the ceramic phase of the first layer comprises gadolinia-doped ceria (GDC), samaria-doped ceria (SDC), ytterbia-doped ceria (YDC), scandia-stabilized zirconia (SSZ), or a combination thereof;
   the ceramic phase of the second layer comprises ytterbia-ceria-scandia-stabilized zirconia (YCSSZ);
   the ceramic phases of both the first and second layers is free of yttria-stabilized zirconia (YSZ).

9. The SOFC of claim 8, wherein the electrolyte comprises YCSSZ.

10. The SOFC of claim 4, wherein the ceramic phases of both the first and second layers is free of yttria-stabilized zirconia (YSZ).

11. A method of operating a fuel cell system comprising a fuel cell stack comprising SOFC's of claim 1, the method comprising:
    operating the system in a power generation mode that comprises providing a fuel and an oxidant to the stack, to generate electricity; and
    operating the system in a shutdown mode that comprises stopping the flow of the fuel and the oxidant to the stack, without intentionally providing an oxidizing purge gas to the stack before the stack reaches room temperature.

12. A solid oxide fuel cell (SOFC) comprising:
    an ionically conductive electrolyte;
    an anode disposed on a first side of the electrolyte, the anode comprising:
    a first layer comprising a cermet comprising a ceramic phase and a metallic phase comprising a metal catalyst; and
    a second layer comprising a cermet comprising a ceramic phase and a metallic phase comprising a metal catalyst; and
    a cathode disposed on an opposing second side of the electrolyte,
    wherein:
    the first layer is disposed between the second layer and the electrolyte;
    at least one of the first and the second layers further comprises a dopant selected from MgO or Mg;
    the dopant is located in the second layer and comprises MgO;
    the metal catalyst of the second layer comprises NiO; and
    the metallic phase of the second layer comprises $Mg_xNi_{1-x}O$, wherein x ranges from about 0.01 to about 0.04.

13. The SOFC of claim 12, wherein:
    the first layer comprises from about 70 to about 90 wt % of the ceramic phase, and from about 10 to about 30 wt % of the metallic phase, based on the total weight of the first layer; and
    the second layer comprises from about 15 to about 35 wt % of the ceramic phase, and from about 65 to about 85 wt % of the metallic phase, based on the total weight of the second layer.

14. The SOFC of claim 13, wherein:
    the ceramic phase of the first and the second layer comprises samaria doped ceria;
    the thickness of the second layer ranges from about 10 μm to about 25 μm; and
    after thirteen redox cycles, the SOFC has a voltage loss of less than about 600 mV.

15. A solid oxide fuel cell (SOFC) comprising:
    an ionically conductive electrolyte;
    an anode disposed on a first side of the electrolyte, the anode comprising:
    a first layer comprising a cermet comprising a ceramic phase and a metallic phase comprising a metal catalyst; and
    a second layer comprising a metallic phase comprising a metal catalyst and a dopant selected from Al, Ca, Ce, Cr, Fe, Mg, Mn, Nb, Pr, Ti, V, W, or Zr, any oxide thereof, or any combination thereof; and
    a cathode disposed on an opposing second side of the electrolyte, wherein the first layer is disposed between the second layer and the electrolyte; and wherein the metallic phase of the second layer comprises:
from about 2 to about 4 atomic percent of the dopant; and
from about 98 to about 96 atomic percent of the metal catalyst.

* * * * *